United States Patent [19]
Hurt et al.

[11] Patent Number: 6,136,089
[45] Date of Patent: Oct. 24, 2000

[54] APPARATUS AND METHOD FOR DEACTIVATING CARBON IN FLY ASH

[75] Inventors: Robert Hurt; Eric Suuberg, both of Barrington; Yu-Ming Gao; Alicia Burnett, both of Providence, all of R.I.

[73] Assignee: Brown University Research Foundation, Providence, R.I.

[21] Appl. No.: 09/144,507

[22] Filed: Aug. 31, 1998

[51] Int. Cl.[7] .............................. C04B 7/12; C04B 18/04
[52] U.S. Cl. ........................ 106/705; 106/405; 106/705; 106/DIG. 1; 209/2
[58] Field of Search ................... 106/405, 705, 106/DIG. 1; 209/2

[56] References Cited

U.S. PATENT DOCUMENTS

| | | | |
|---|---|---|---|
| 4,663,507 | 5/1987 | Trerice | 106/DIG. 1 |
| 5,160,539 | 11/1992 | Cochran | 106/405 |
| 5,173,662 | 12/1992 | Trerice et al. | 324/642 |
| 5,177,444 | 1/1993 | Cutmore | 324/637 |
| 5,299,692 | 4/1994 | Nelson et al. | 209/2 |
| 5,390,611 | 2/1995 | John | 110/165 A |
| 5,399,194 | 3/1995 | Cochran et al. | 106/405 |
| 5,484,476 | 1/1996 | Boyd | 106/405 |
| 5,513,755 | 5/1996 | Heavilon et al. | 209/2 |
| 5,555,821 | 9/1996 | Martinez | 110/191 |
| 5,729,470 | 3/1998 | Baier et al. | 31/7 |
| 5,749,308 | 5/1998 | Bachik | 110/344 |
| 5,817,230 | 10/1998 | Groppo, Jr. et al. | 106/405 |
| 5,840,179 | 11/1998 | Minkara et al. | 106/405 |
| 5,868,084 | 2/1999 | Bachnik | 110/257 |
| 5,887,724 | 3/1999 | Weyand et al. | 209/2 |

OTHER PUBLICATIONS

Chemical Abstract No. 127:222526. abstract of Canadian Patent Specification No. 2163193, (Nov. 1995).
Japanese Patent Abstract No. JP403270777A, abstract of Japanese Patent Specification No. 03–270777 (Dec. 1991).
Gao et al., "Effects of Carbon on Air Entrainment in Fly Ash Concrete: The Role of Soot and Carbon Black", *Energy & Fuels, An American Chemical Society Journal*, 11(2):457–462 (1997)*.
Hachmann et al., "Surfactant Adsorptivity of Solid Products from the Pulverized–Coal Combustion under Controlled Conditions", presented at the 27th International Suposium on Combustion, Boulder, CO, Aug. 1998.

*Primary Examiner*—Anthony Green
*Attorney, Agent, or Firm*—William S. Galliani; Pennie & Edmonds LLP

[57] ABSTRACT

An apparatus and method for improving the properties of carbon-containing fly ash through ozonation is described. The apparatus includes a chamber for containing the fly ash and an ozonator that generates an ozone-containing gas. The ozonator supplies the ozone-containing gas such that it enters the chamber with the fly ash and deactivates carbon within the fly ash. Afterwards, the fly ash will have decreased surfactant adsorptivity so that it can be effectively mixed with cement or whatever other materials may require fly ash with passivated carbon.

7 Claims, 4 Drawing Sheets

APPARATUS AND METHOD FOR DEACTIVATING CARBON IN FLY ASH

BRIEF DESCRIPTION OF THE INVENTION

This invention relates generally to the processing of fly ash. More particularly, this invention relates to treating fly ash with ozone in order to deactivate carbon in the fly ash and thereby allow the fly ash to be used as an additive in various applications.

BACKGROUND OF THE INVENTION

Fly ash is the by-product of the combustion of coal. Disposal of fly ash is expensive. Thus, there are ongoing efforts to identify uses for fly ash. Fly ash is presently used as a concrete admixture, as a soil stabilizer, and as a filler for asphalt and structural materials, such as bricks.

The concrete industry serves as one of the most important commercial outlets for fly ash, since fly ash is used in concrete as a partial replacement for Portland cement. However, high levels of unburned carbon can make fly ash samples unusable as a concrete filler. Carbon in the fly ash interferes with the action of air entraining admixtures, or specialty surfactants, which are used to stabilize air bubbles in concrete mixtures. Measurements made on a variety of model additives suggest that admixtures are adsorbed by carbon surfaces from the aqueous phase. The adsorption process is believed to occur preferentially on nonpolar carbonaceous surface area.

Exposing fly ash to air at high temperatures, called thermal air oxidation, reveals a change in surface chemistry that occurs just prior to combustion of carbon in fly ash. The surface oxidation has the effect of changing a carbon property so that fly ash can be effectively utilized in cement-containing mixtures. Unfortunately, thermal air oxidation is an impractical industrial process because temperatures on the order of 400° C. are required to effectively passivate carbon.

Additionally, processes utilizing other oxidizing agents such as hydrogen peroxide ($H_2O_2$) and nitric acid ($HNO_3$) are available. The problem with these other processes is that the oxidizing agents are liquid. Wet treatments make fly ash difficult to handle, transport, and use.

In view of the foregoing, it would be highly desirable to provide an inexpensive and practical technique that allows deactivation of carbon within fly ash samples. The technique should reduce the surfactant adsorptivity of carbon without detrimentally changing other properties of the fly ash. Furthermore, the technique should be a dry process that functions at low temperature.

SUMMARY OF THE INVENTION

The invention includes an apparatus and method for deactivating carbon in fly ash. The apparatus includes an ozonator and a chamber enclosing the fly ash. The ozonator generates an ozone-containing gas that is fed to the chamber so that the ozone-containing gas deactivates carbon in the fly ash. The method of the invention includes the steps of delivering fly ash to a reaction zone and exposing the fly ash to ozone-containing gas to deactivate carbon in the fly ash.

The invention is used to deactivate carbon within fly ash by changing a property of the carbon so that the fly ash can be used as an additive, for example, in cement to form concrete. The invention allows profitable sale of fly ash for which disposal is otherwise expensive.

BASIC DESCRIPTION OF THE DRAWING

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
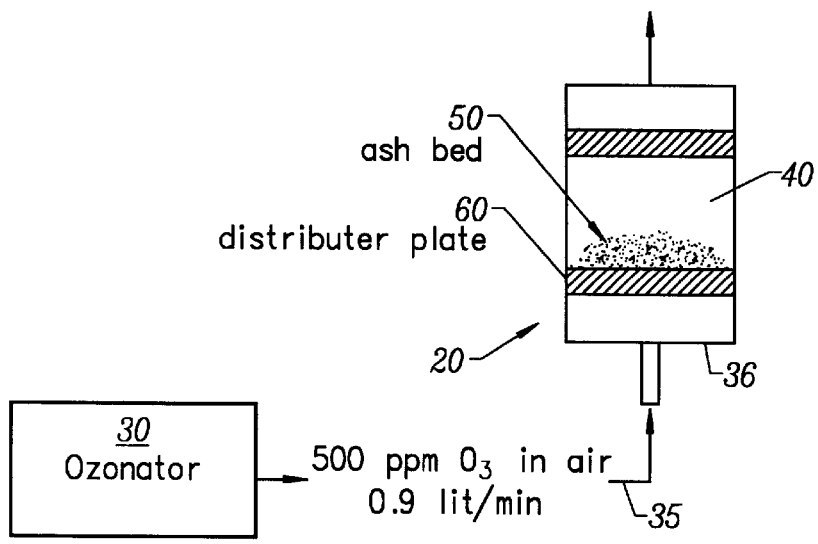
FIG. 1 illustrates an apparatus constructed in accordance with an embodiment of the invention.
Figure 2:
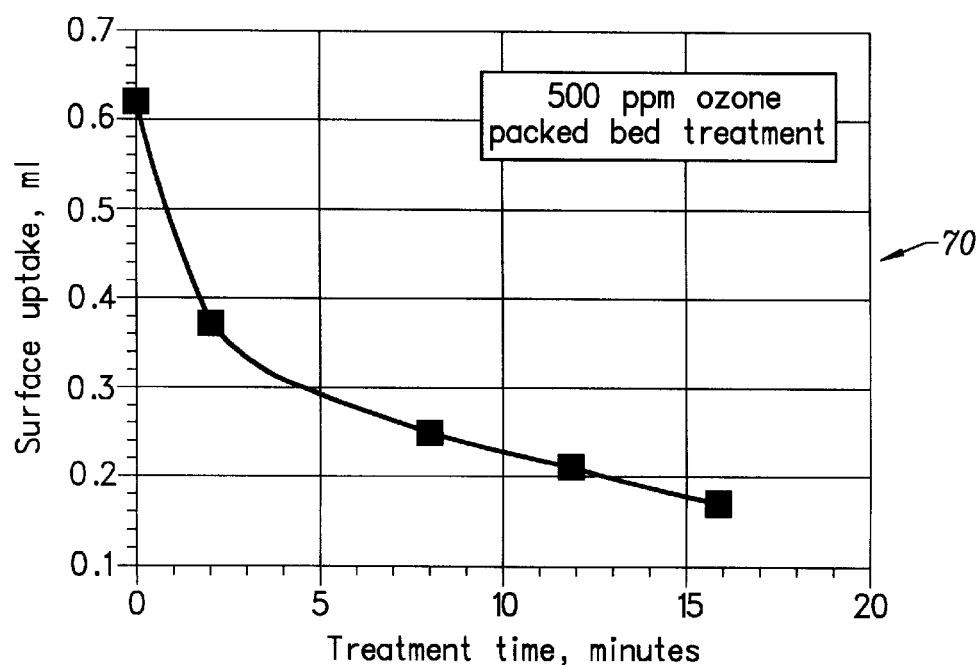
FIG. 2 illustrates surfactant uptake as a function of ozone exposure time.

FIG. 1 illustrates an apparatus 20 for deactivating carbon in fly ash in accordance with an embodiment of the invention. The apparatus 20 includes an ozonator 30 that generates an ozone-containing gas which is applied to a conduit 35. By way of example, the ozone-containing gas consists of 500 ppm ozone in air at a rate of 0.9 liters per minute. A chamber 36 defines a reaction zone 40. The chamber 36 also supports a distributor plate 60. Fly ash 50 is delivered to the distributor plate 60. The ozone-containing gas then passes through the conduit 35, through the distributor plate 60 and then through the fly ash 50. Forcing the ozone-containing gas through the fly ash more effectively deactivates carbon than blowing ozone-containing gas over the fly ash. Advantageously, these operations may be performed at ambient temperature (approximately 20° C.). This procedure may also be efficiently used at approximately 150° C., which is a common fly ash handling and storage temperature. At this higher temperature, the ozone exposure time can be reduced in half FIG. 2 illustrates a graph 70 showing the results of ozonation using a fixed bed reactor of the type shown in FIG. 1, with surfactant adsorptivity plotted as a function of time. The ozonator source is an aquarium grade ozonator capable of producing 500 ppm $O_3$ in air (lower in concentration than the ozone and oxygen combination from FIG. 3 by a factor of 60). The aquarium grade ozonator supplies approximately 0.9 liters per minute of the ozone-containing air to the fixed bed, where the ozone containing air passes through a packed bed of 5 grams of fly ash. The lower ozone concentration results in a decreased effect on the surfactant adsorptivity, but is still productive enough so that after 2 minutes an originally marginal ash stream is useable in concrete.

Those skilled in the art will note a number of important discoveries associated with the foregoing information. Although thermal oxidation has been shown to have a beneficial effect on fly ash, one could not conclude that ozonation would have a similar effect. Prior art teachings demonstrate that different oxidizing agents produce different functional groups on carbon surfaces. Little is known about the nature of the surfaces that one needs to establish treated flyash, which, for example, may be used in concrete. For these reasons, one does not know a priori whether a given oxidizing reagent will produce the desired effect on ash. However, the foregoing data demonstrates a highly successful result.

Those skilled in the art will also observe that it was not clear that ozone would have any activity near ambient temperature or at a typical ash handling and storage temperature (approximately 150° C.). Ozone is a very reactive chemical, but many reactions do not occur at appreciable speeds at or near room temperature. In many cases ozone is used at somewhat elevated temperatures to modify solid surfaces. The present discovery establishes the feasibility of room-temperature or near roomtemperature treatment of ash to passivate its carbon component.

Figure 3:
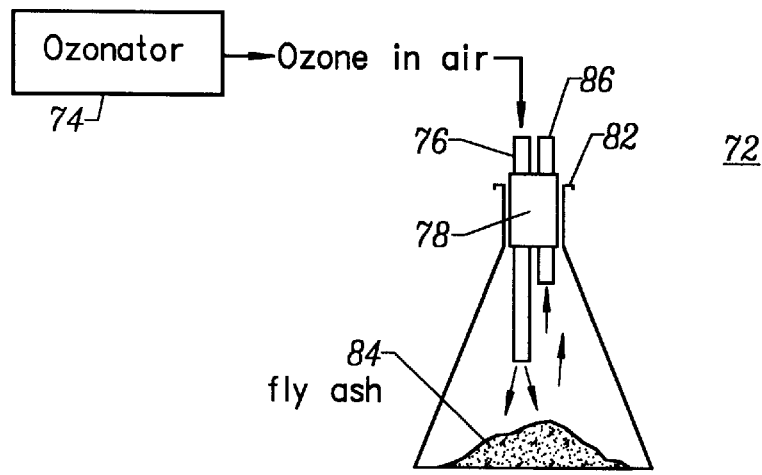
FIG. 3 illustrates the experimental set-up used to derive the data for FIG. 4.

FIG. 3 illustrates an apparatus 72 for deactivating carbon in fly ash in accordance with another embodiment of the invention. The apparatus 72 was used to generate the data in FIG. 4. An ozonator 74 generates a stream of ozone containing air (3% $O_3$ in air) which is applied to an in-flow feeder tube 76. The in-flow feeder tube 76 is secured by a stopcock 78 which in turn plugs the opening of a beaker 82. The beaker 82 contains a sample of fly ash 84. The ozone containing air reacts with the sample of fly ash 84 and exits the beaker 82 through the out-flow feeder tube 86, also secured by the stopcock 78.

Figure 4:
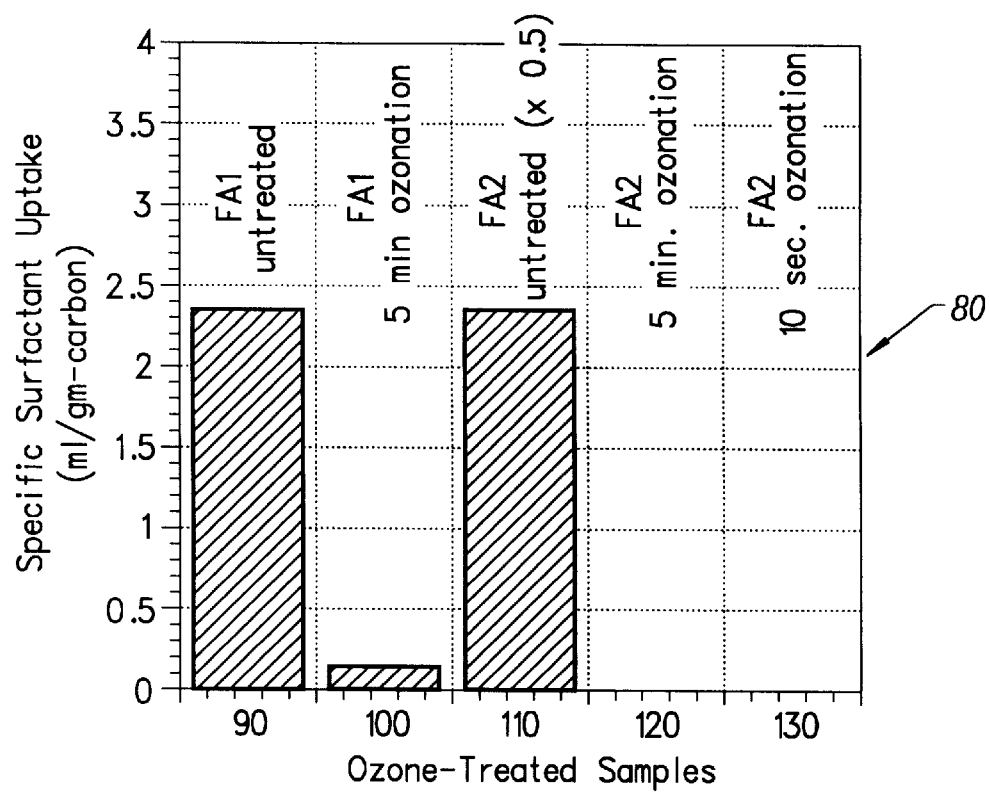
FIG. 4 illustrates the effects of an ozone-containing gas on different fly ash samples.

FIG. 4 illustrates a graph 80 showing the effect of the apparatus 72 from FIG. 3 on different fly ash samples, with surfactant adsorptivity plotted for different fly ash samples. The first bar graph 90 represents the surfactant adsorptivity of a first sample of untreated fly ash. The second bar graph 100 represents the surfactant adsorptivity of a 1 gram sample of the first sample of fly ash after exposing the fly ash to a stream of ozone-containing air (3% $O_3$ in air), as illustrated in FIG. 3, for 5 minutes. The third bar graph 110 represents a second sample of untreated fly ash. The fourth bar graph 120 represents the results of a 5 minute ozonation on the second sample. This processing results in negligible surfactant adsorptivity of the carbon. The fifth bar graph 130 represents a 10 second ozonation period for the second fly ash sample, also resulting in negligible surfactant adsorptivity. The treatment of the invention is expected to also be effective for other coal ashes, ammonia-treated ashes, and ashes from alternative solid fuels.

Figure 5:
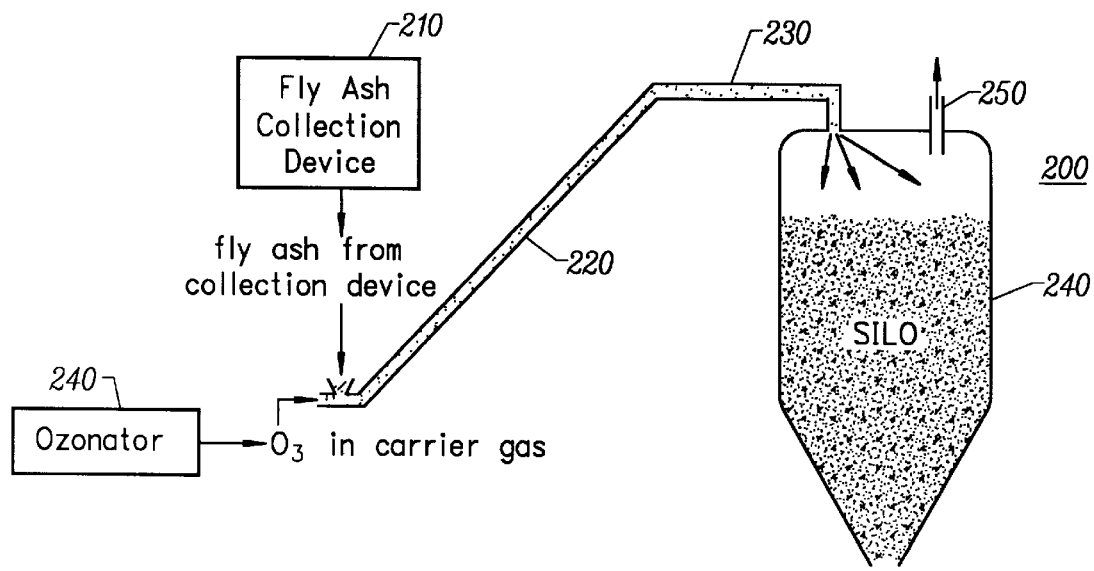
FIG. 5 illustrates a first example of an industrial contacting scheme using pneumatic conveying.

The remaining figures represent examples of industrial processes for oxidation of fly ash in accordance with embodiments of the invention. FIG. 5 illustrates an apparatus 200 useful for oxidation of fly ash using a pneumatic conveyor. A fly ash collector 210 deposits fly ash 220 within a pneumatic conveyor tube 230. An ozonator 240 supplies an ozone containing gas to the pneumatic conveyor tube 230. The ozone containing gas transports the fly ash 220 through the pneumatic conveyor tube 230 and into a silo 240. The fly ash 220 settles in the silo 240 while the ozone containing gas exits through a vent 250.

Figure 6:
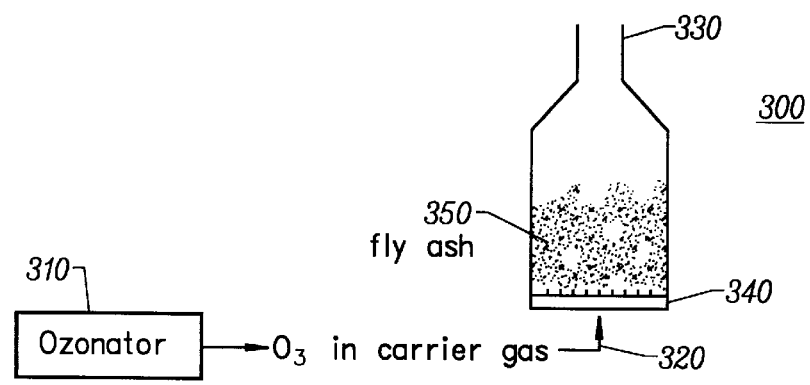
FIG. 6 illustrates a second example of an industrial contacting scheme with a fluidized bed.

FIG. 6 illustrates an apparatus 300 for oxidation of fly ash using a fluidized bed. An ozonator 310 delivers an ozone containing gas to a conduit 320. The conduit 320 delivers the gas to a chamber 330 containing a reactor bed 340. The ozone containing gas passes through the reactor bed 340 and suspends at least portions of the fly ash 350 above the reactor bed 340.

Figure 7:
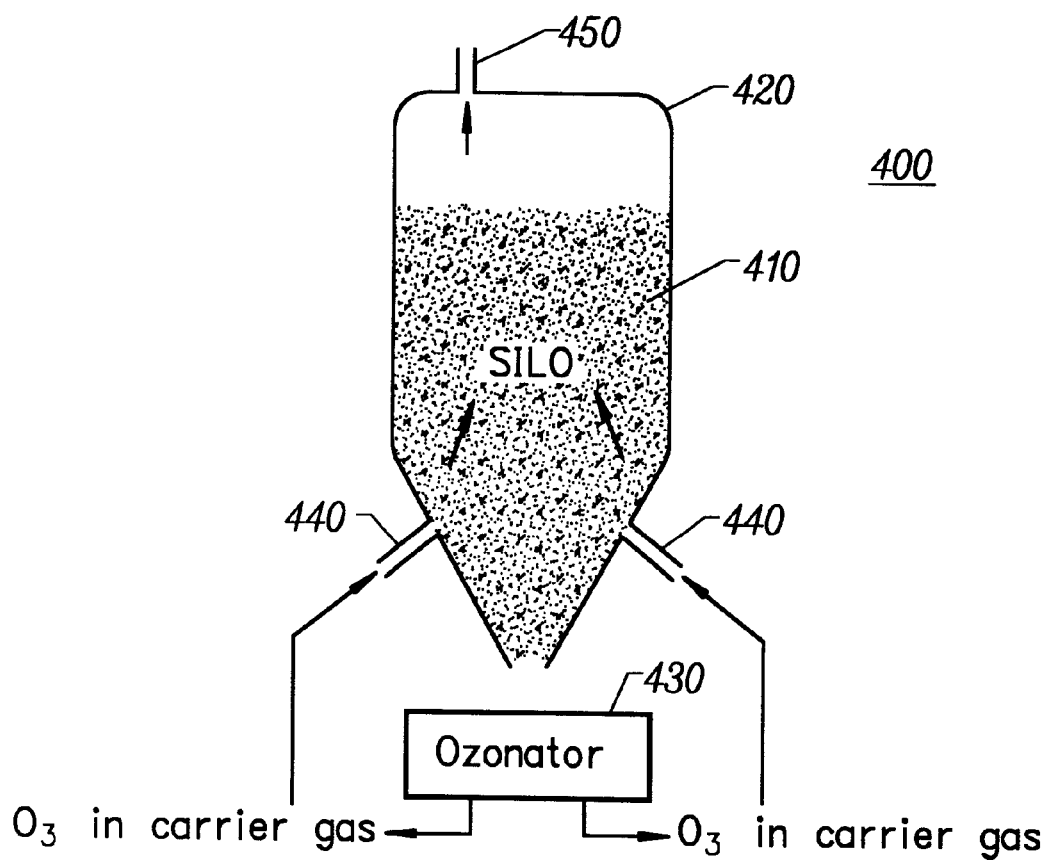
FIG. 7 illustrates a third example of an industrial contacting scheme in a storage silo.

FIG. 7 illustrates an apparatus 400 for oxidizing fly ash 410 while in a storage silo 420. An ozonator 430 supplies an ozone containing gas to a series of conduits 440. The conduits deliver the ozone containing gas to the storage silo 420 where the gas flows up through the fly ash 410. The ozone containing gas exits the storage silo 420 through a vent 450 and may then be treated or recycled. This embodiment may use existing ash handling and storage equipment.

Those skilled in the art will recognize that other techniques may be used in connection with the teachings of the invention. For example, the techniques of the invention can be applied to the ash suspended in an aqueous phase. Any technique that establishes good contact between fly ash and ozone can be used in accordance with the invention. Thus, any number of contacting schemes used with existing ash handling equipment may be utilized in accordance with the invention.

The invention provides for the inexpensive oxidation of fly ash. The oxidized surfaces produced by the technique of the invention are believed to be polar. The treated fly ash of the invention facilitates the profitable sale of fly ash which would otherwise be relegated to lower value uses or disposal. Thus, the fly ash produced by the invention can be sold to concrete suppliers or anyone else needing fly ash with passivated carbon. An important commercial outlet for coal ash is in the concrete industry as a partial replacement for Portland cement. Passivated fly ash is sold to concrete manufacturers as a filler, rather than paying for its disposal. The alternative, thermal air oxidation, is not practical due to the high temperatures required by the process. Additionally, wet treatments of fly ash make it difficult to handle, transport, and use.

The technique of the invention also renders the fly ash surfaces more predictable and constant. Thus, the variable combustion conditions in full-scale power plants can be more readily controlled.

Different combinations of gas and ozone may achieve the deactivation of carbon over different time periods, depending on the desired decrease in surfactant adsorptivity. Additionally, applications of the invention by industry necessitate large quantities of fly ash with possibly differing methods of delivering the ozonecontaining gas to the fly ash. The industrial examples provided are not meant to serve as an exhaustive list of oxidation techniques.

The foregoing description, for purposes of explanation, used scientific nomenclature to provide a thorough understanding of the invention. However, it will be apparent to one skilled in the art that the specific details are not required in order to practice the invention. In another instance, a well known device is shown in block diagram form in order to avoid unnecessary distraction from the underlying invention. The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method of deactivating carbon in coal fly ash, said method comprising the steps of:

delivering coal fly ash to a reaction zone; and exposing said coal fly ash to ozone-containing gas to deactivate carbon in said coal fly ash; wherein said exposing step passivates carbon within said coal fly ash and operates to reduce surfactant uptake of said coal fly ash.

2. The method of claim 1 wherein said delivering and exposing steps are performed at substantially ambient temperature.

3. The method of claim 1 wherein said delivering and exposing steps are performed at a common fly ash handling and storage temperature.

4. The method of claim 1 wherein said exposing step includes the step of exposing said fly ash to an ozone-containing gas comprising oxygen and 3% ozone.

5. The method of claim 1 wherein said exposing step includes the step of exposing said fly ash to an ozone-containing gas comprising approximately 500 ppm ozone in air.

6. The method of claim 1 wherein said exposing step includes the step of exposing said fly ash to said ozone-containing gas by delivering said ozone-containing gas to the bottom of said reaction zone such that said ozone-containing gas passes through said fly ash.

7. Fly ash produced by the method of claim 1.

\* \* \* \* \*